United States Patent
Lee et al.

(10) Patent No.: US 11,019,601 B2
(45) Date of Patent: May 25, 2021

(54) METHOD AND DEVICE FOR RECEIVING MBMS CONTROL INFORMATION THROUGH BEAM

(71) Applicant: LG ELECTRONICS INC., Seoul (KR)

(72) Inventors: Youngdae Lee, Seoul (KR); Hanbyul Seo, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 16/320,184

(22) PCT Filed: Jul. 26, 2017

(86) PCT No.: PCT/KR2017/008025
§ 371 (c)(1),
(2) Date: Jan. 24, 2019

(87) PCT Pub. No.: WO2018/021812
PCT Pub. Date: Feb. 1, 2018

(65) Prior Publication Data
US 2019/0268879 A1 Aug. 29, 2019

Related U.S. Application Data

(60) Provisional application No. 62/366,641, filed on Jul. 26, 2016.

(51) Int. Cl.
*H04B 7/00* (2006.01)
*H04W 72/00* (2009.01)
(Continued)

(52) U.S. Cl.
CPC ......... *H04W 72/005* (2013.01); *H04W 16/28* (2013.01); *H04W 72/00* (2013.01);
(Continued)

(58) Field of Classification Search
CPC ............... H04W 72/12; H04W 72/121; H04W 72/1263; H04W 72/1273; H04W 72/1278
(Continued)

(56) References Cited

U.S. PATENT DOCUMENTS 7,801,480 B2 * 9/2010 Becker ................ H04L 12/1877
455/3.01
8,170,569 B2 * 5/2012 Kuningas ............ H04W 72/005
455/450
(Continued)

FOREIGN PATENT DOCUMENTS

KR 101023373 3/2011
KR 20140056561 5/2014
(Continued)

OTHER PUBLICATIONS

3GPP, TS 36.300 version 13.2.0 Release 13, Jan. 2016.*
(Continued)

*Primary Examiner* — Dmitry Levitan
(74) *Attorney, Agent, or Firm* — Fish & Richardson P.C.

(57) ABSTRACT

Disclosed are a method by which a terminal receives multimedia broadcast multicast service (MBMS) control information through a beam in a wireless communication system, and a device for supporting the same. The method can comprise the steps of: selecting a beam; transmitting, to a base station, an MBMS control information request message including a beam index for indicating the selected beam; and receiving, from the base station, the MBMS control information through the beam according to the MBMS control information request message.

13 Claims, 13 Drawing Sheets

(51) Int. Cl.
*H04W 72/02* (2009.01)
*H04W 72/04* (2009.01)
*H04W 72/08* (2009.01)
*H04W 72/14* (2009.01)
*H04W 16/28* (2009.01)
*H04W 72/12* (2009.01)

(52) U.S. Cl.
CPC ....... *H04W 72/02* (2013.01); *H04W 72/0413* (2013.01); *H04W 72/085* (2013.01); *H04W 72/12* (2013.01); *H04W 72/14* (2013.01)

(58) Field of Classification Search
USPC .......................................... 370/310, 328, 390
See application file for complete search history.

(56) References Cited

U.S. PATENT DOCUMENTS

| | | | | |
|---|---|---|---|---|
| 8,842,597 B2 * | 9/2014 | Jiao | ..................... | H04W 72/005 |
| | | | | 370/312 |
| 8,982,872 B2 * | 3/2015 | Gou | ..................... | H04L 49/90 |
| | | | | 370/350 |
| 9,491,735 B2 * | 11/2016 | Dorenbosch | ........ | H04W 72/005 |
| 9,668,110 B2 * | 5/2017 | Hu | ..................... | H04W 72/005 |
| 9,948,439 B2 * | 4/2018 | Kwak | .................. | H04B 7/0695 |
| 10,425,200 B2 * | 9/2019 | Islam | ..................... | H04L 5/0032 |
| 10,541,741 B2 * | 1/2020 | Islam | ................... | H04W 40/248 |
| 10,757,682 B2 * | 8/2020 | Jang | ..................... | H04L 65/4076 |
| 2014/0120926 A1 * | 5/2014 | Shin | ..................... | H04W 48/12 |
| | | | | 455/450 |
| 2019/0222293 A1 * | 7/2019 | Lee | ..................... | H04W 72/046 |

FOREIGN PATENT DOCUMENTS

| | | |
|---|---|---|
| KR | 20160081755 | 7/2016 |
| WO | 2014163382 | 10/2014 |
| WO | WO2015/137656 | 9/2015 |
| WO | 2016006860 | 1/2016 |

OTHER PUBLICATIONS

Chang et al., "Channel Feedback Reduction for Wireless Multimedia Broadcast Multicast Service Systenls", IEEE ICC 2015, Communication Theory Symposium, pp. 4443-4447.

EP Supplementary Search Report in European Application No. EP 17834753, dated Feb. 5, 2020, 9 pages.

* cited by examiner

METHOD AND DEVICE FOR RECEIVING MBMS CONTROL INFORMATION THROUGH BEAM

CROSS-REFERENCE TO RELATED APPLICATIONS

This application is the National Stage filing under 35 U.S.C. 371 of International Application No. PCT/KR2017/008025, filed on Jul. 26, 2017, which claims the benefit of U.S. Provisional Application No. 62/366,641 filed on Jul. 26, 2016, the contents of which are all hereby incorporated by reference herein in their entirety.

BACKGROUND OF THE INVENTION

Field of the Invention

The present invention relates to a wireless communication system, and more particularly, to a method in which a terminal receives multimedia broadcast multicast service (MBMS) control information through a beam, and an apparatus supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

In addition, in the 5G communication system, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In addition, in the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, with an increase in a data communication amount, there is ongoing discussion for effectively using a radio resource. On-demand system information (OSI) has been proposed as one way of such an effort. In case of the OSI, a terminal may request for system information at a cell, and upon receiving the request, a network may transmit the requested system information to the terminal.

SUMMARY OF THE INVENTION

Meanwhile, the super high frequency band is considered in the 5G communication system to accomplish the higher data rate, and the beamforming technique is discussed to decrease the propagation loss of the radio wave and increase the transmission distance in the super high frequency band. Accordingly, there is a need to newly propose a method of receiving MBMS control information through beamforming.

In addition, there is a need for a technique for transmitting MBMS control information while preventing unnecessary resource consumption.

According to an embodiment, there is provided a method in which a user equipment (UE) receives multimedia broadcast multicast service (MBMS) control information through a beam in a wireless communication system. The method includes: selecting a beam; transmitting to a base station (BS) an MBMS control information request message including a beam index indicating the selected beam; and receiving from the BS the MBMS control information through the beam according to the MBMS control information request message.

The MBMS control information request message may include at least one of an MBMS service that the UE is interested in, a frequency at which the MBMS service is broadcast, a cell in which the MBMS service is broadcast, and information regarding whether the UE supports SC-PTM (Single Cell-Point To Multipoint) transmission or MBSFN transmission.

The MBMS control information request message may be transmitted through at least one of a random access preamble, random access resource information indicating the selected beam, L1 uplink control information, an MAC control element, and an RRC message including an index of the selected beam and a UE identity.

The method may further include, before the selecting of the beam, receiving from the BS a message including each piece of scheduling information regarding the MBMS control information through multiple beams.

Each piece of scheduling information may differ for the multiple beams.

The selecting of the beam may include: measuring quality of multiple beams transmitted by the BS; and selecting the beam from among the multiple beams on the basis of the measured quality of the beams.

The selected beam may be a beam of which measured quality is the best quality among the multiple beams transmitted by the BS.

The selected beam may be a beam of which measured quality is greater than or equal to a predefined threshold among the multiple beams transmitted by the BS.

The selected beam may be plural in number.

The scheduling information may further include uplink information regarding the MBMS control information, and the update information may indicate an update state of the MBMS control information.

The update state of the MBMS control information may be indicated by a value tag.

The message may be a physical downlink control channel (PDCCH).

A window of a time domain in which the MBMS control information is scheduled may be defined on a beam basis.

A window of a time domain in which the MBMS control information is scheduled may be defined for a set of multiple beams.

According to another embodiment, there is provided a UE for receiving MBMS control information through a beam in a wireless communication system. The UE may include: a memory; a transceiver; and a processor for coupling the memory and the transceiver. The processor may be configured to: selecting a beam; transmitting to a BS an MBMS control information request message including a beam index indicating the selected beam; and receiving from the BS the MBMS control information through the beam according to the MBMS control information request message.

According to an embodiment of the present invention, MBMS control information can be effectively received based on beamforming.

In addition, according to an embodiment of the present invention, the MBMS control information is received only when a UE requests a BS to provide the MBMS control information, thereby preventing radio resources from being unnecessarily consumed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
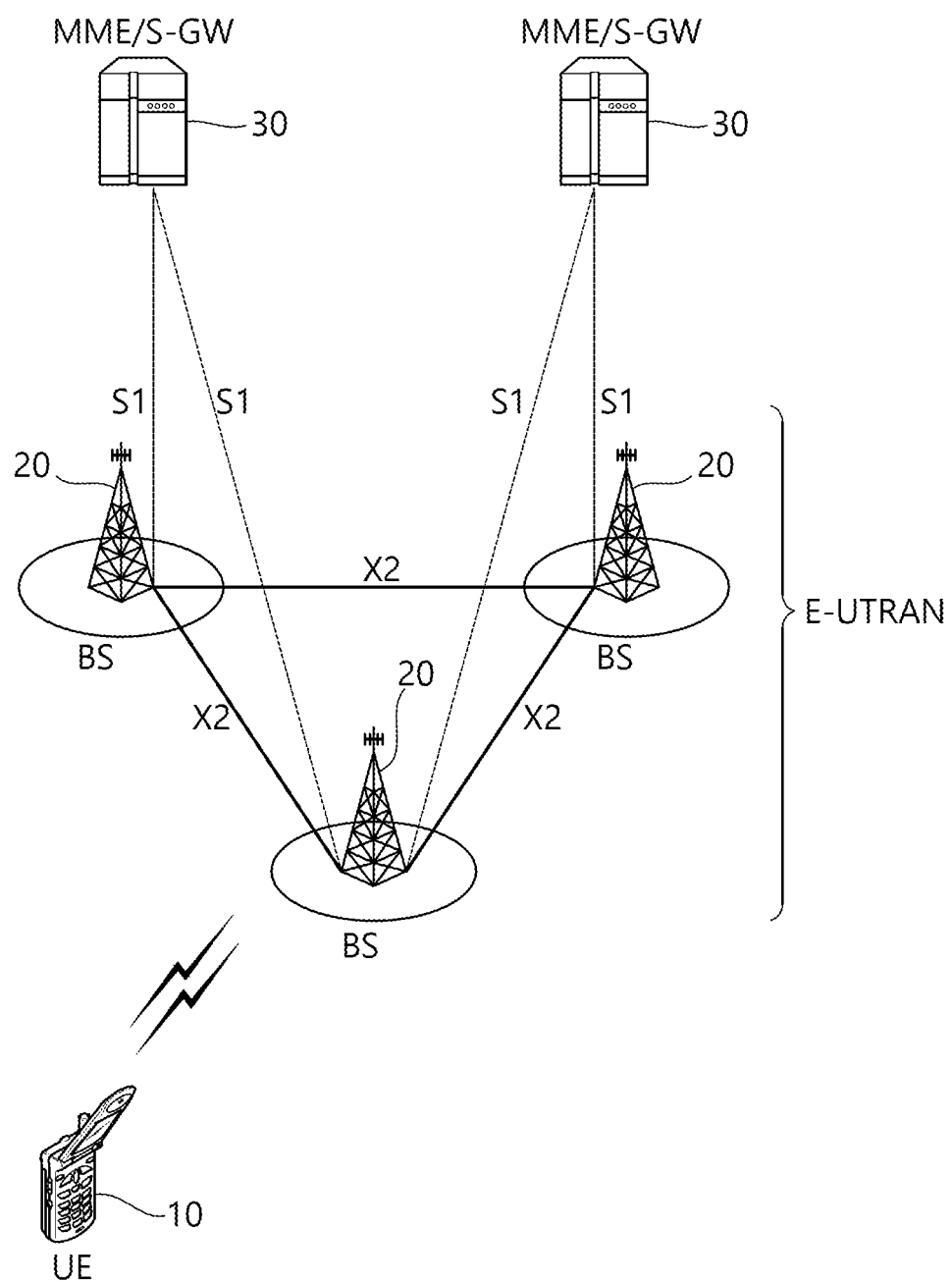
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
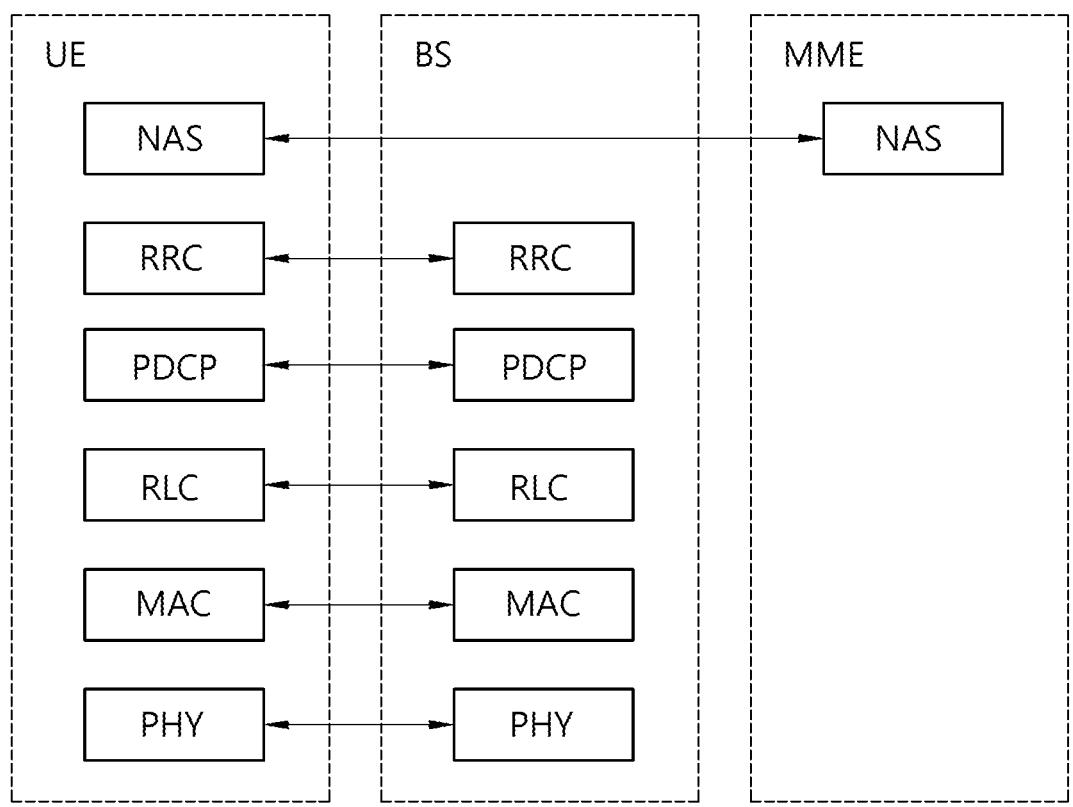
FIG. 2 shows a block diagram of a control plane protocol stack of an LTE system.
Figure 3:
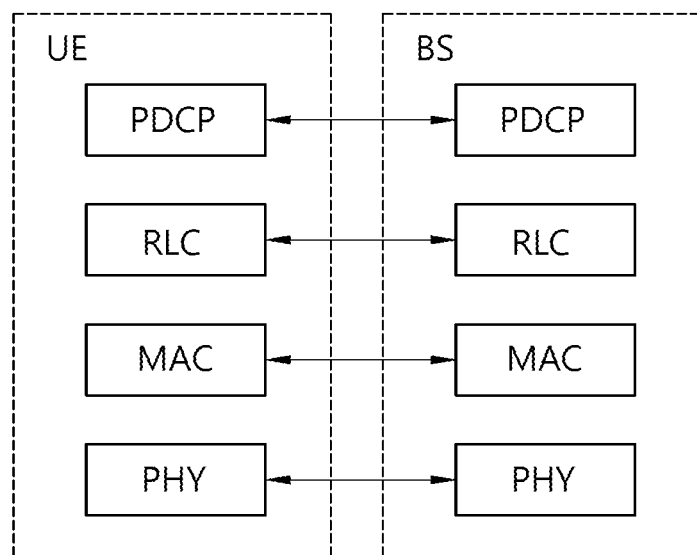
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Multimedia broadcast multicast services (MBMS) are described.

Figure 4:
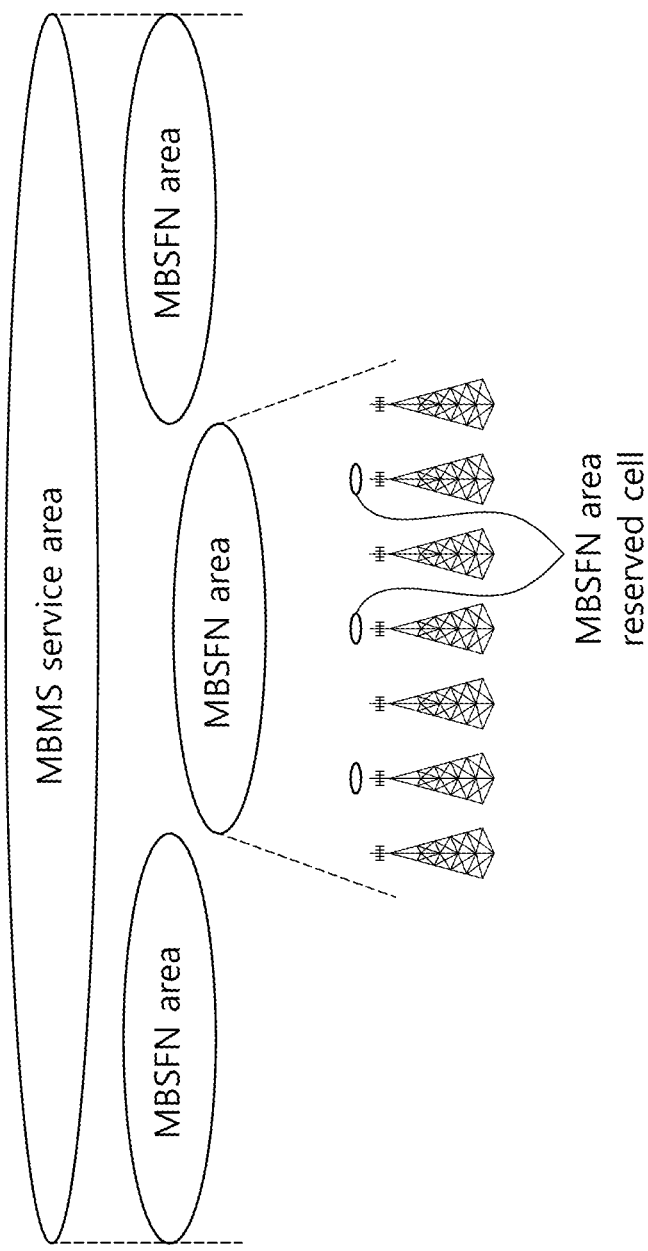
FIG. 4 shows multimedia broadcast multicast service (MBMS) definitions.

FIG. 4 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In general the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. In this release of the specification, an MBMS capable UE is only required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH i.e. both the time domain scheduling as well as the lower layer configuration are semi-statically configured, as defined within SystemInformationBlockType13.

For MBMS user data, which is carried by the MTCH logical channel, E-UTRAN periodically provides MCH scheduling information (MSI) at lower layers (MAC). This MCH information only concerns the time domain scheduling i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

Figure 5:
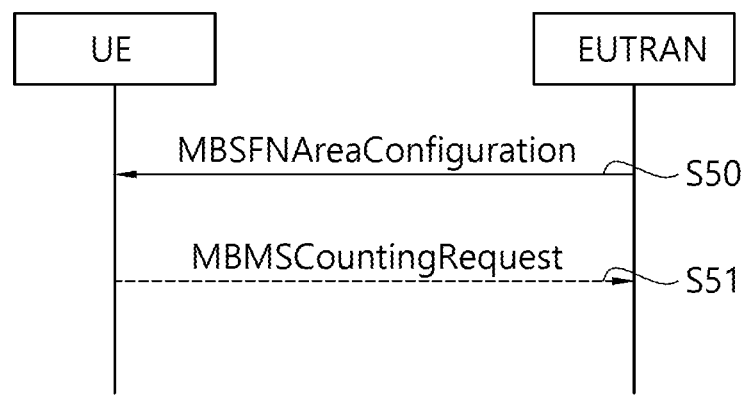
FIG. 5 shows a procedure for acquiring multicast control channel (MCCH) information.

FIG. 5 illustrates a procedure for acquiring MCCH information.

The UE applies the MCCH information acquisition procedure to acquire the MBMS control information that is broadcasted by the E-UTRAN. The procedure applies to MBMS capable UEs that are in RRC_IDLE or in RRC_CONNECTED. A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH that corresponds with the service that is being received, at the start of each modification period.

Unless explicitly stated otherwise in the procedural specification, the MCCH information acquisition procedure overwrites any stored MCCH information, i.e. delta configuration is not applicable for MCCH information and the UE discontinues using a field if it is absent in MCCH information unless explicitly specified otherwise.

An MBMS capable UE shall:
1> if the procedure is triggered by an MCCH information change notification:
2> start acquiring the MBSFNAreaConfiguration message and the MBMSCountingRequest message (S50) if present, from the beginning of the modification period following the one in which the change notification was received;
1> if the UE enters an MBSFN area:
2> acquire the MBSFNAreaConfiguration message (S50) and the MBMSCountingRequest message (S51) if present, at the next repetition period;
if the UE is receiving an MBMS service:
start acquiring the MBSFNAreaConfiguration message (S50) and the MBMSCountingRequest message (S51) if present, that both concern the MBSFN area of the service that is being received, from the beginning of each modification period;

In the E-UTRAN, MBMS may provide a single-frequency network operating mode (MBSFN) only through a frequency layer shared with non-MBMS services (a set of cells supporting both unicast and MBMS transmissions, that is, a set of "MBMS/unicast-mixed cells").

MBMS reception is possible for UEs in the RRC_CONNECTED or RRC_IDLE state. Whenever receiving MBMS services, a user may be notified of an incoming call, and occurring calls may be possible. Robust header compression (ROHC) is not supported in MBMS.

Hereinafter, system information will be described.

Figure 6:
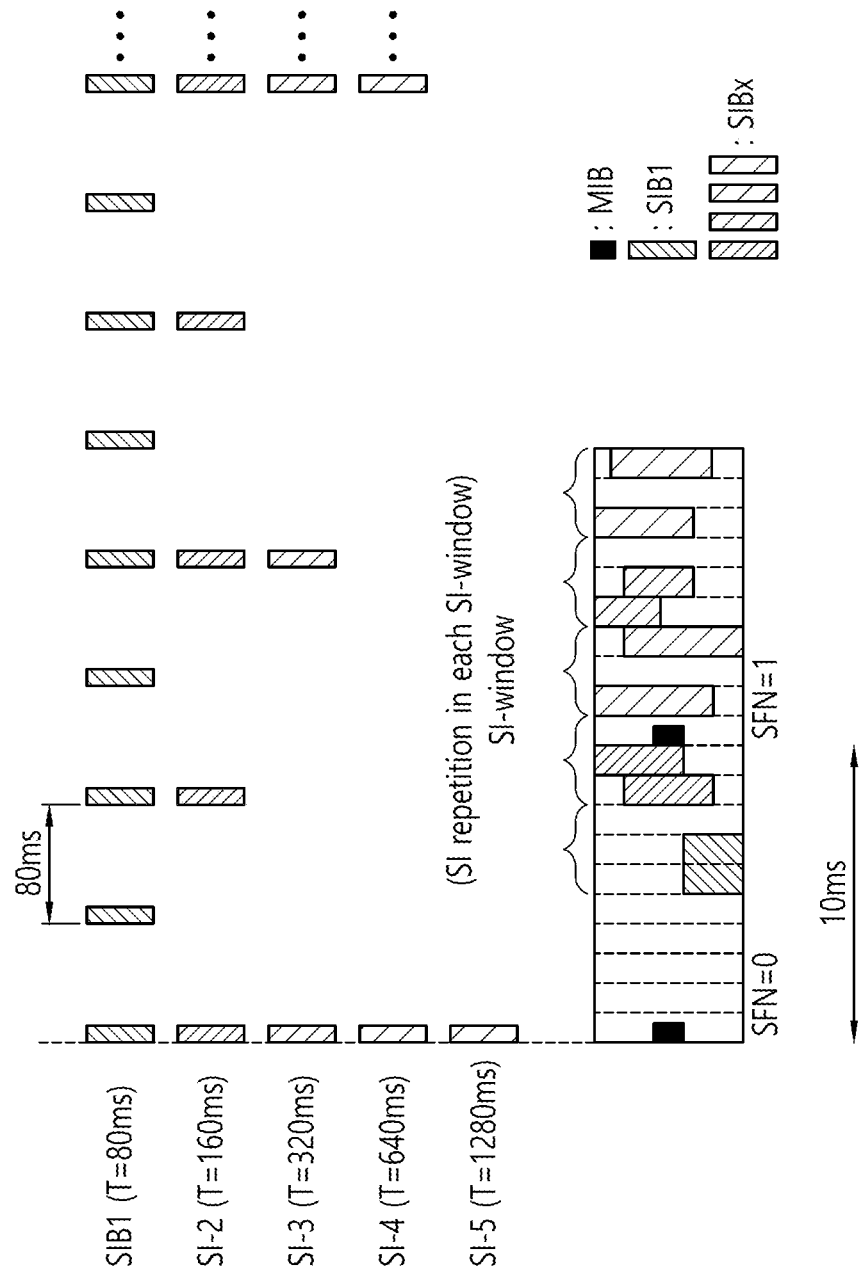
FIG. 6 shows an example of transmitting a master information block (MIB), a system information block1 (SIB1), and other Ms.

FIG. 6 shows an example of transmitting a master information block (MIB), a system information block1 (SIB1), and other Ms.

An LTE cell broadcasts basic parameters necessary for an operation of an IDLE_MODE UE and a CONNECTED_MODE UE via a plurality of separate information blocks. Examples of the information blocks include an MIB, SIB1, SIB2, and other system information blocks (or SIBn).

The MIB includes the most essential parameters needed for a UE to access a cell. Referring to FIG. 6, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than the SIB1. SIBs having the same transmission periodicity among the Ms other than the SIB1 are transferred via the same system information (SI) message. Thus, scheduling information includes a mapping relationship between each SIB and the SI message. The SI message is transmitted within an SI-window in a time domain, and each SI message is associated with one SI-window. Since SI-windows for different pieces of SI do not overlap, only one SI message is transmitted within any SI-window. Thus, scheduling information includes a length of the SI-window and an SI transmission periodicity. Time/frequency for transmitting the SI message is determined by dynamic scheduling of a BS. The SIB1 is broadcast through a downlink shared channel (DL SCH) according to a periodicity of eight radio frames (that is, 80-ms periodicity), and the SIB1 is repeatedly retransmitted on a fifth subframe of an SFN-mod-2 radio frame within the 80-ms periodicity.

SIB2 includes necessary information for a UE to access a cell. The SIB2 includes information on an uplink cell bandwidth, a random access parameter, a parameter related to uplink power control, or the like.

SIB3 includes cell reselection information. SIB4 includes frequency information on a serving cell and intra-frequency information on a neighboring cell related to cell reselection. SIB5 includes frequency information on a different E-UTRA frequency and inter-frequency information on a neighboring cell related to cell reselection. SIB6 includes frequency information on a UTRA frequency and information on a UTRA neighboring cell related to cell reselection. SIB7 includes frequency information on a GERAN frequency related to cell reselection. SIB8 includes information on a neighboring cell.

SIB9 includes a Home eNodeB (HeNB) identity (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 includes information related to GPS time and coordinated universal time (UTC). SIB17 includes RAN auxiliary information.

Not all SIBs are always required to be present. For example, the SIB9 is not needed in a mode in which a provider establishes an HeNB, and the SIB13 is not needed if a cell provides no MBMS.

System information is commonly applied to all UEs accessing a cell, and UEs need to always maintain up-to-date system information to perform an appropriate operation. When the system information is changed, the UEs need to know in advance the time at which the BS transmits new system information. In order that the BS and the UE mutually recognize a radio frame period for transmitting the new system information, the concept of BCCH modification period is introduced in "3GPP TS 36.331 v9.3.0," which is described below in detail.

Figure 7:
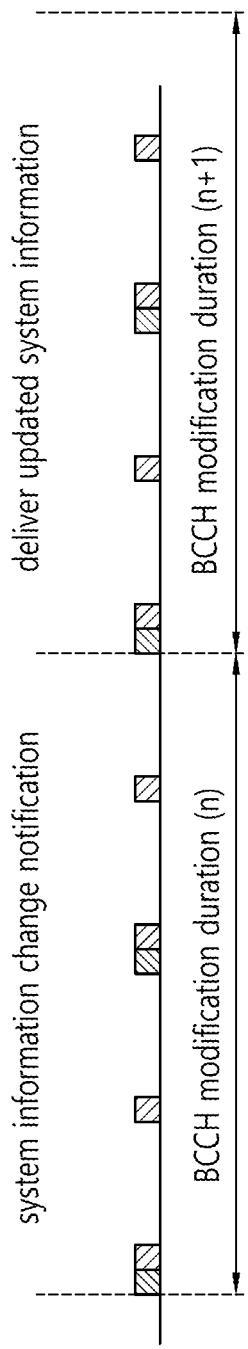
FIG. 7 shows an update of system information.

FIG. 7 shows an update of system information.

Referring to FIG. 7, a BS, which intends to update system information in an (n+1)th modification period, notifies in advance UEs of an update of system information in an nth modification period. A UE, which is notified of the update of the system information in the nth modification period, receives and applies new system information at the very beginning of the (n+1)th modification period. When the update of the system information is scheduled, the BS includes a system information modification indicator in a paging message. Generally, a paging message is a message received by an idle-mode UE. However, since the update of the system information is notified through the paging message, a connected-mode UE also needs to receive the paging message at times and to identify the update of the system information.

Hereinafter, beamforming will be described.

A beamforming technology using multiple antennas may be broadly divided into an analog beamforming technology (hereinafter, "analog beamforming") and a digital beamforming technology (hereinafter, "digital beamforming") depending on where a beamforming weight vector or pre-coding vector is applied.

Figure 8:
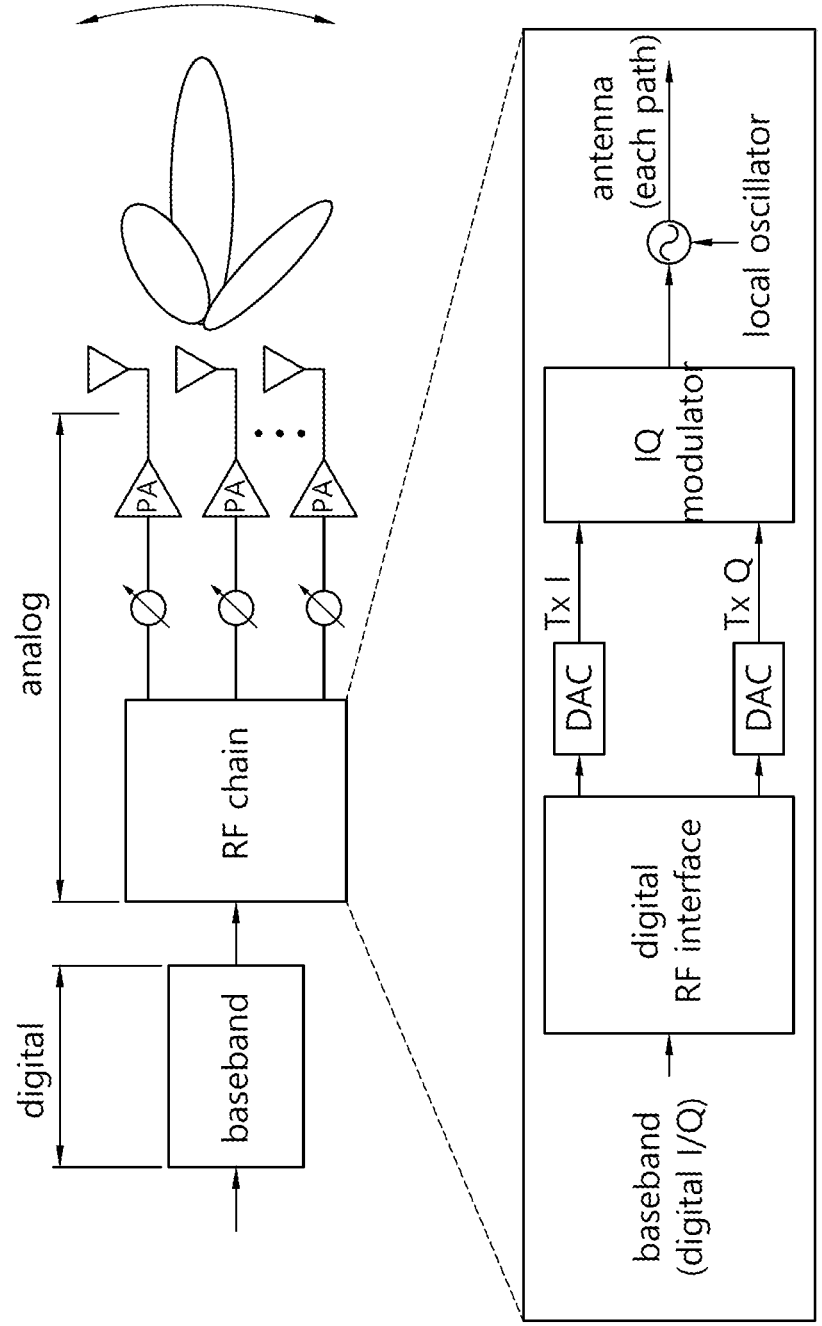
FIG. 8 shows an example of analog beamforming.

FIG. 8 shows an example of analog beamforming.

The analog beamforming is a typical beamforming technique applied to earlier multi-antenna structures. In the analog beamforming, a beam is formed by partitioning an analog signal, produced by digital signal processing, into a plurality of paths and configuring phase shift (PS) and power amplifier (PA) settings for each path. Referring to FIG. 8, in the analog beamforming, an analog signal derived from a single digital signal is processed by the PS and PA connected to each antenna. That is, the PS and the PA handle a complex weight in an analog stage. Herein, an RF chain refers to a processing block that converts a baseband signal into an analog signal. In the analog beamforming, beam precision is determined by characteristics of elements of the PS and PA, and is advantageous for narrowband transmission according to control characteristics of the elements. Meanwhile, a hardware structure makes it difficult to implement multi-stream transmission, thus making a multiplexing gain for higher data rates relatively small and making it difficult to form a beam per user based on orthogonal resource allocation.

Figure 9:
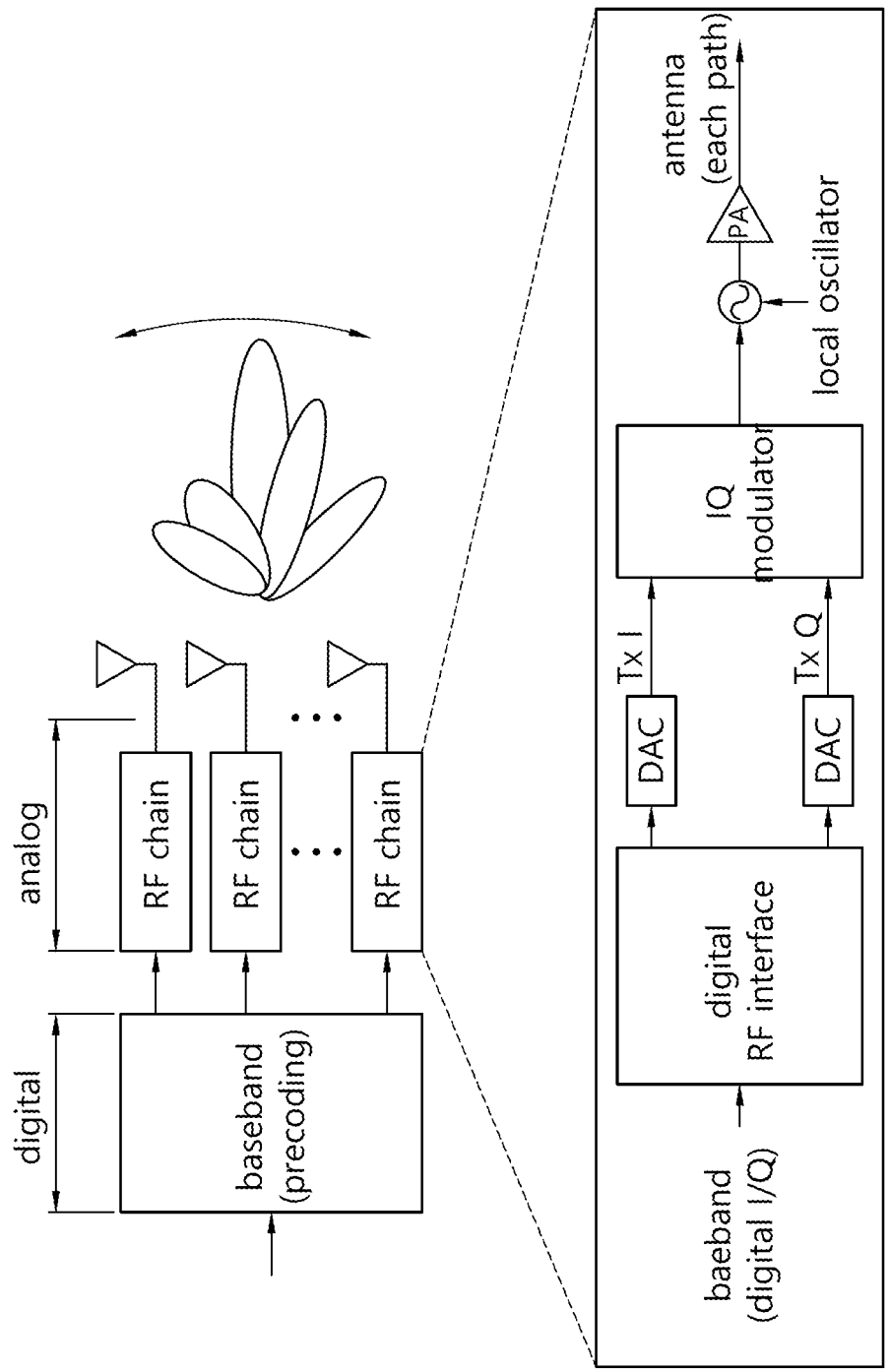
FIG. 9 shows an example of digital beamforming.

FIG. 9 shows an example of digital beamforming.

The digital beamforming differs from the analog beamforming in that a beam is formed in a digital stage by using baseband processing to maximize diversity and multiplexing gain in a MIMO environment. Referring to FIG. 9, the beam may be formed by performing precoding in the baseband processing. An RF chain may include a PA. Accordingly, a complex weight derived for beamforming may be directly applied to transmitted data. The digital beamforming may support simultaneous multi-user beamforming because a different beam may be formed for each user. Moreover, the digital beamforming allows for forming an independent beam for each user to whom an orthogonal resource is allocated, thus providing high scheduling flexibility and enabling to operate the transmitting end according to a system purpose. In addition, the digital beamforming allows for forming an independent beam per subcarrier when a technology such as MIMO-OFDM is used in a broadband transmission environment. Thus, the digital beamforming may optimize a maximum data rate of a single user on the basis of increased system capacity and enhanced beam gain. Therefore, digital beamforming-based MIMO technology was adopted to 3G/4G systems.

Meanwhile, a massive multiple-input multiple-output (MIMO) environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in the massive MIMO environment. When conventional digital beamforming is used in the massive MIMO environment, since digital signal processing should be performed for hundreds of transmit antennas through baseband processing, the complexity of signal processing increases considerably, and since as many RF chains as the number of transmit antennas are required, the complexity of hardware implementation increases considerably. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in the massive MIMO environment, the hardware complexity at a transmitting end is relatively low, but the performance increase through the use of a plurality of antennas is only slight and flexibility of resource allocation is reduced. In particular, in broadband transmission, it is very hard to perform beam control for each frequency.

Accordingly, the massive MIMO environment requires hybrid beamforming, which is a combination of the analog beamforming and the digital beamforming, rather than using either the analog beamforming or the digital beamforming as a beamforming technology. That is, a hybrid-type transmitting end structure may be needed so as to lower the complexity of hardware implementation at the transmitting end according to characteristics of the analog beamforming and to maximize a beamforming gain using a large number of transmit antennas according to characteristics of the digital beamforming.

Figure 10:
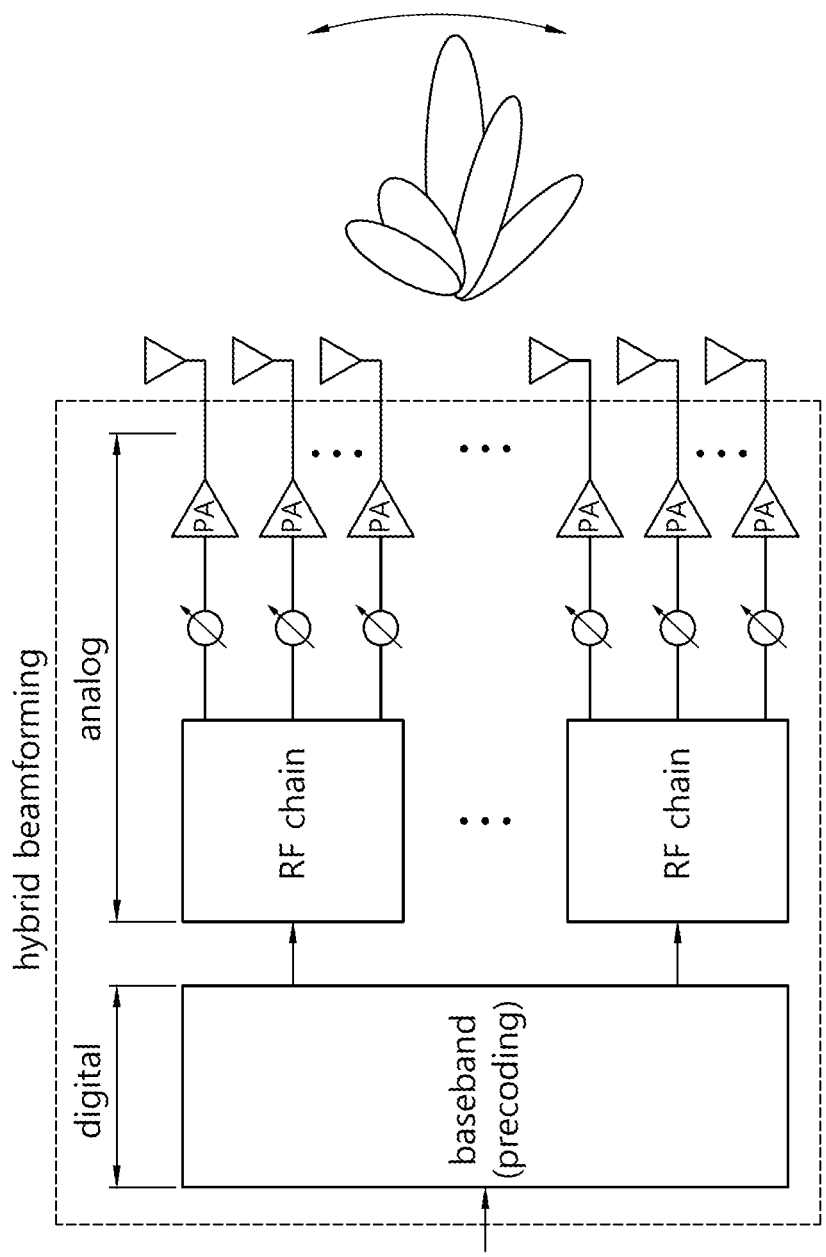
FIG. 10 shows an example of hybrid beamforming.

FIG. 10 shows an example of hybrid beamforming.

As described above, the hybrid beamforming is aimed at configuring a transmitting end capable of taking advantages of analog beamforming and digital beamforming in a large MIMO environment. Referring to FIG. 10, the hybrid beamforming basically forms a coarse beam through the analog beamforming and forms a beam for multiple streams or multi-user transmission through the digital beamforming. That is, the hybrid beamforming may have a structure for simultaneously taking the analog beamforming and the digital beamforming in order to lower the implementation complexity or the hardware complexity of the transmitting end.

In order to achieve a high data rate, a super high frequency (millimeter wave (mmW)) band is considered in a new RAT. Since the super high frequency band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breadth of 5 cm and a length of 5 cm. If the plurality of antenna elements are used in the super high frequency band, the coverage can be increased and the throughput can be improved by the increase of the beamforming gain.

Meanwhile, with an increase in a data communication amount, there is ongoing discussion for effectively using a radio resource. Hereinafter, a method in which a UE receives MBMS control information on the basis of beamforming and an apparatus supporting the method will be described according to an embodiment of the present invention.

According to an embodiment of the present invention, the UE may request for MBMS control information. According to the request, the UE may indicate a beam selected by the UE and capability of the UE related to MBMS. After the request, the UE may determine when downlink transmission will be monitored to receive the requested MBMS control information.

Figure 11:
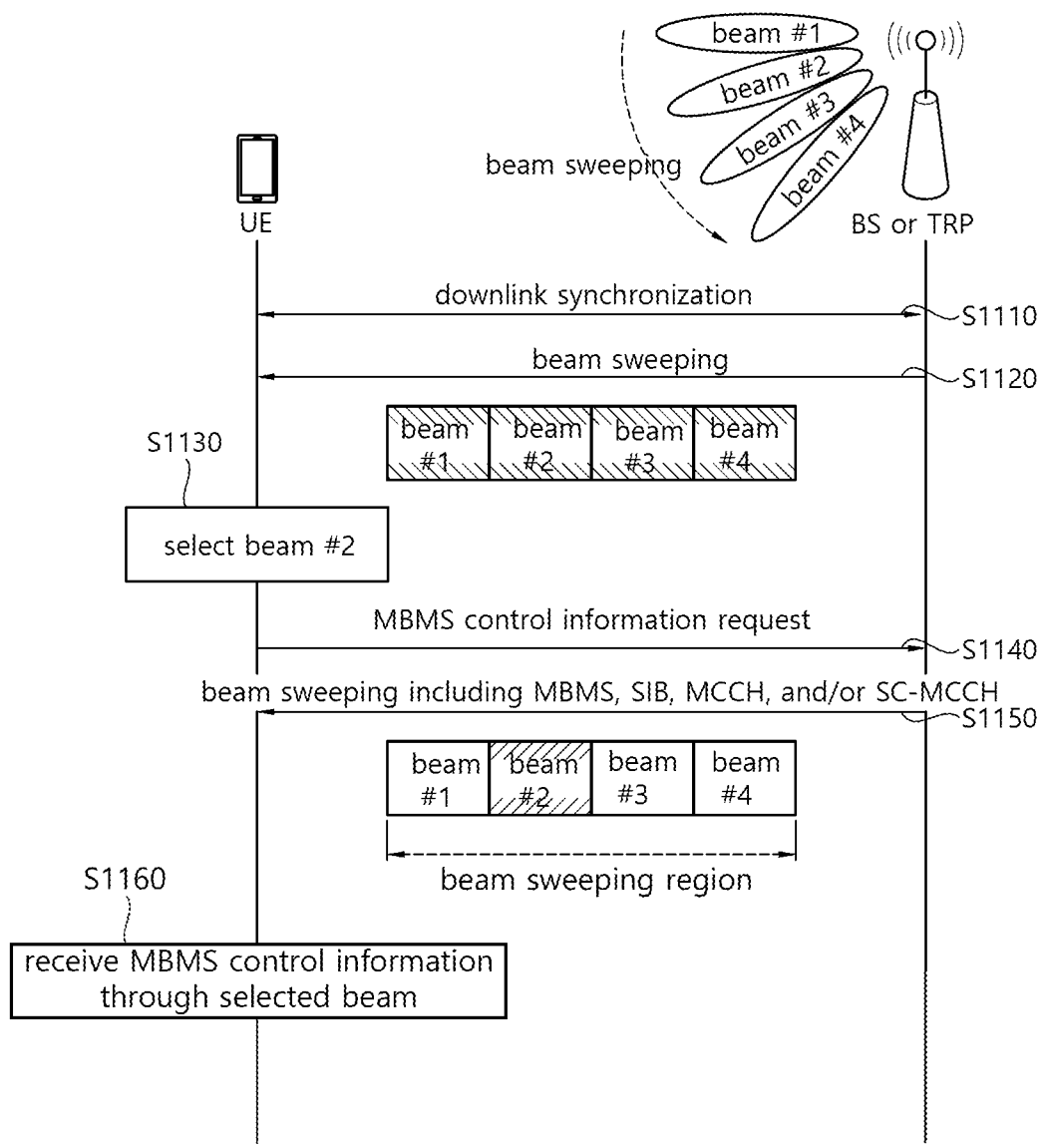
FIG. 11 shows a procedure of receiving MBMS control information on the basis of beamforming according to an embodiment of the present invention.

FIG. 11 shows a procedure of receiving MBMS control information on the basis of beamforming according to an embodiment of the present invention.

Referring to FIG. 11, a BS may perform beam sweeping. Although it is assumed in the embodiment of FIG. 11 that the BS sweeps a first beam to a fourth beam, this only implies that the BS can sweep multiple beams, and the number of beams to be swept is not limited by the embodiment of FIG. 11. The BS may be referred to as a transmission reception point (TRP).

In step S1110, the UE may perform downlink synchronization to the TRP or a cell of the BS.

In step S1120, the BS may transmit multiple beams in a beam sweeping region. The beam sweeping region may imply a region in which the BS entirely or partially sweeps an antenna beam of the BS. The BS may broadcast a PDCCH or a first information block by using multiple beams. Different beams may be transmitted at different time intervals. For example, the different beams may be transmitted in different symbols or different subframes possibly with a beam interference signal (BRS). The first information block or the PDCCH may be transmitted repeatedly through different beams. The first information block may correspond to either MIB or SIB type A. For example, the SIB type A may be SIB1, SIB13, SIB15, or SIB20.

The first information block which is transmitted on an Nth beam may indicate scheduling information regarding MBMS control information which is transmitted on the Nth beam. The value N may be any one integer between 1 to the maximum number of beams at the BS, the cell, or the TRP. The MBMS control information corresponds to any one of SIs related to MBMS, one or more messages on an MCCH, or one or more messages on an SC-MCCH (Single Cell-MCCH). For example, the SI related to the MBMS may be SIB13, SIB15, or SIB20. The scheduling information which is transmitted on the beam may include at least any one of information related to scheduling of the MBMS control information and information related to an update of the MBMS control information.

Information regarding scheduling of MBMS control information: Information regarding scheduling of the MBMS control information may indicate when the MBMS control information will be scheduled. For example, the information regarding scheduling of the MBMS control information may indicate a window in which the MBMS control information can be scheduled for a corresponding beam. The window implies a time domain in which data is transmitted. In the embodiment of FIG. 11, an information block #1 transmitted on a beam #1 may include scheduling information for specific MBMS control information transmitted on the beam #1, and the scheduling information may indicate a window in which the specific MBMS control information is scheduled on the beam #1. Likewise, the information block #1 transmitted on a beam #2 may include scheduling information regarding specific MBMS control information transmitted on the beam #2, and the scheduling information may indicate a window in which the specific MBMS control information is scheduled on the beam #2.

Information related to an update of MBMS control information: Information related to an update of the MBMS control information may indicate an update state of the MBMS control information. For example, the information related to the update of the MBMS control information may be a value tag. The information related to the update of the MBMS control information may indicate an update state of the MBMS control information for a corresponding beam. In the embodiment of FIG. 11, an information block #1 transmitted on the beam #1 may include scheduling information for specific MBMS control information transmitted on the beam #1, and the scheduling information may indicate whether the specific MBMS control information is updated on the beam #1. Likewise, the information block #1 transmitted on the beam #2 may include scheduling information regarding specific MBMS control information transmitted on the beam #2, and the scheduling information may indicate whether the specific MBMS control information is updated on the beam #2.

The PDCCH may be addressed by RNTI (Radio Network Temporary Identifier). For example, the RNTI may be SI-RNTI (System Information-RNTI). The PDCCH may be repeatedly transmitted through different beams. The RNTI may be allocated on a beam basis. For example, RNTI #1 may be mapped to the beam #1, RNTI #2 may be mapped to the beam #2, and RNTI #N may be mapped to a beam #N. The PDCCH addressed by the RNTI #N may indicate transmission of the MBMS control information through the beam #N.

Alternatively, if a PDCCH addressed by RNTI is transmitted through a beam #I, DCI in the PDCCH may indicate the beam #I. If the UE selects the beam #I, the UE may receive the MBMS control information on a PDSCH through the beam #I according to the PDCCH. The PDCCH may be addressed by RNTI #1. Alternatively, the PDCCH may indicate the beam #1.

In step S1130, the UE may measure quality of each beam by receiving different beams at different time intervals. In addition, the UE may select a beam on the basis of the measured quality of the beam. The UE may select a beam which provides the highest measurement quality among all beams. Alternatively, the UE may select one or more beams of which measured quality is greater than or equal to a threshold. In the embodiment of FIG. 11, it is assumed that the UE has selected the beam #2 on the basis of the measure quality of the beam.

In step S1140, the UE may request the MBMS control information to a network through the MBMS control information request message. That is, the UE may request the network to transmit the MBMS control information, similarly to on-demand system information (OSI). Herein, the OSI indicates a delivery type of system information transmitted from the network only for a case where it is requested by the UE. Meanwhile, the MBMS control information request message indicates a selected beam (i.e., a beam index indicating the selected beam), an MBMS service that the UE is interested in, a frequency at which the MBMS service of interest can be broadcast, a cell in which the MBMS service can be broadcast, and UE capability related to an MBMS property. The UE capability related to the MBMS property may be capability related to SC-PTM transmission of the UE or capability related to MBSFN transmission. That is, the UE capability related to the MBMS property may indicate whether the UE supports a transmission type of the MBMS service.

The MBMS control information request may be transmitted through any one of the following options.

Option 1: The MBMS control information request may be transmitted through a random access preamble, a random access preamble set, or a random access resource indicating a selected beam. Mapping between a beam and the random access preamble, the random access preamble set, or the random access resource may be signaled to the UE through system information from the BS.

Option 2: The MBMS control information request may be transmitted through L1 uplink control information. The L1 uplink control information may be, for example, a PUCCH or a PUSCH.

Option 3: The MBMS control information request may be transmitted through an MAC control element.

Option 4: The MBMS control information request may be transmitted through an RRC message including an index of the selected beam and a UE identity of the UE. The RRC message may be transmitted during a system information request procedure (i.e., when the UE requests the BS to deliver system information), an RRC connection establishment procedure, an RRC connection resumption procedure, an RRC connection re-establishment procedure, or an RRC cell update procedure. The RRC message may be an RRC connection request message, an RRC connection re-establishment request message, an RRC connection resume request message, an MBMS interest indication message, or a cell update message.

The UE may start a timer after transmitting the MBMS control information request.

In step S1150, the UE may know when MBMS control information is transmitted through the selected beam. The MBMS control information may be transmitted to the UE through the selected beam within a window of a time domain. The BS may provide MBMS-related SIB, MCCH, and/or SC-MCCH to the UE through beam sweeping. A start point of the window is determined based on a time offset from transmission of the MBMS control information request message and a beam index of a beam in which the MBMS control information request message is transmitted. A length of the window is determined based on the maximum number of beams used for an MBMS service. Alternatively, the start point of the window may be a time point at which a timer starts, and an end point of the window may be a time point at which the timer expires.

The window may be defined on a beam basis. Alternatively, the window may be defined for all beams or a set of beams at a cell.

Option 1: A window in which MBMS control information can be transmitted may be defined on a beam basis. The UE may select a window in which the selected beam can be scheduled. If the UE selects multiple beams, the UE may select multiple windows. The UE may monitor a PDCCH within the selected window to receive the MBMS control information. In the embodiment of FIG. 11, the window may be defined for each of the beam #1, the beam #2, the beam #3, and the beam #4, and a UE which has selected the beam #2 may select a window defined for the beam #2 and may monitor a PDCCH within the selected window.

Option 2: The window in which the MBMS control information can be scheduled may be defined for all beams or a set of beams at a cell. The UE may select a beam interval in which the selected beam can be scheduled. If the UE selects multiple beams, the UE may select multiple beam intervals. The UE may monitor a PDCCH within the selected beam interval to receive a message. In the embodiment of FIG. 11, only one window may be defined for the beam #1 to the beam #4, and a UE which has selected the beam #2 may select a beam interval corresponding to the beam #2, and may monitor the PDCCH within the selected beam interval.

In step S1160, the UE may receive the MBMS control information on the PDSCH from the selected beam within the selected window.

Figure 12:
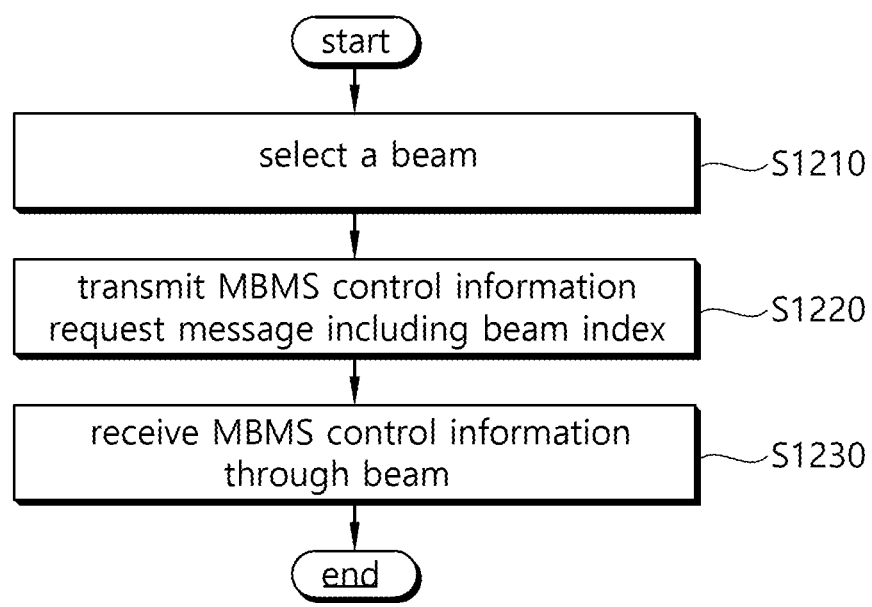
FIG. 12 is a block diagram showing a method in which a UE receives MBMS control information through a beam according to an embodiment of the present invention.

FIG. 12 is a block diagram showing a method in which a UE receives MBMS control information through a beam according to an embodiment of the present invention.

In step S1210, the UE may select a beam. Specifically, the UE may receive a message including each piece of scheduling information regarding the MBMS control information from a BS through multiple beams. Herein, each piece of scheduling information may differ for the multiple beams. The message may be a physical downlink control channel (PDCCH).

The scheduling information may further include uplink information regarding the MBMS control information. The uplink information may indicate an update state of the MBMS control information. In addition, the update state of the MBMS control information may be indicated by a value tag.

The selecting of the beam may include: measuring quality of multiple beams transmitted by the BS; and selecting the beam from among the multiple beams on the basis of the measured quality of the beams. In this case, the selected beam may be a beam of which measured quality is the best quality among the multiple beams transmitted by the BS. In addition, the selected beam may be a beam of which measured quality is greater than or equal to a predefined threshold among the multiple beams transmitted by the BS. In addition, the selected beam may be plural in number.

In step S1220, the UE may transmit to the BS an MBMS control information request message including a beam index indicating the selected beam.

The MBMS control information request message may include at least one of an MBMS service that the UE is interested in, a frequency at which the MBMS service is broadcast, a cell in which the MBMS service is broadcast, and information regarding whether the UE supports SC-PTM transmission or MBSFN transmission. In addition, the MBMS control information request message may be transmitted through at least one of a random access preamble, random access resource information indicating the selected beam, L1 uplink control information, an MAC control element, and an RRC message including an index of the selected beam and a UE identity.

In step S1230, the UE may receive the MBMS control information through the beam according to the MBMS control information request message. Specifically, the UE may receive the MBMS control information from the BS within a window through the selected beam. A window of a time domain in which the MBMS control information is scheduled may be defined on a beam basis. In addition, the window of the time domain in which the MBMS control information is scheduled may be defined for a set of multiple beams.

Figure 13:
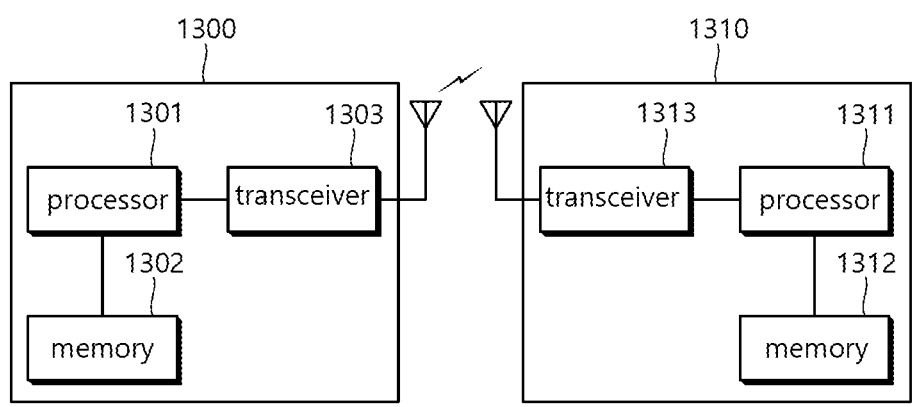
FIG. 13 is a block diagram illustrating a wireless apparatus in which an embodiment of the present invention can be implemented.

FIG. 13 is a block diagram illustrating a wireless apparatus in which an embodiment of the present invention can be implemented.

ABS 1300 includes a processor 1301, a memory 1302, and a radio frequency (RF) unit 1303. The memory 1302 is coupled to the processor 1301, and stores a variety of information for driving the processor 1301. The RF unit 1303 is coupled to the processor 1301, and transmits and/or receives a radio signal. The processor 1301 implements the proposed functions, procedures, and/or methods. In the aforementioned embodiments, an operation of the BS may be implemented by the processor 1301.

A UE 1310 includes a processor 1311, a memory 1312, and an RF unit 1313. The memory 1312 is coupled to the processor 1311, and stores a variety of information for driving the processor 1311. The RF unit 1313 is coupled to the processor 1311, and transmits and/or receives a radio signal. The processor 61 implements the proposed functions, procedures, and/or methods. In the aforementioned embodiments, an operation of the UE 1310 may be implemented by the processor 1311.

The processors 1311 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of receiving multimedia broadcast multicast service (MBMS) control information through a downlink beam by a user equipment (UE) in a wireless communication system, the method comprising:
   receiving, by the UE from a base station (BS), a message comprising scheduling information for the MBMS control information related to each of multiple downlink beams;
   selecting, by the UE, at least one downlink beam among the multiple downlink beams;
   transmitting, by the UE to a base station (BS), an MBMS control information request message comprising at least one beam index respectively related to the at least one selected downlink beam; and receiving, by the UE from the BS, the MBMS control information through the at least one downlink beam in response to the MBMS control information request message, wherein the MBMS control information includes at least one of system information related to MBMS, information included in Multicast Control Channel (MCCH), or information included in Single Cell-MCCH (SC-MCCH), and wherein the message comprising the scheduling information is received through a physical downlink control channel (PDCCH).

2. The method of claim 1, wherein the MBMS control information request message that is transmitted to the BS comprises at least one of an MBMS service that the UE is interested in, a frequency at which the MBMS service is broadcast, a cell in which the MBMS service is broadcast, or information related to whether the UE supports Single Cell-Point To Multipoint (SC-PTM) transmission or Multicast Broadcast Single Frequency Network (MBSFN) transmission.

3. The method of claim 1, wherein the MBMS control information request message is transmitted through at least one of a random access preamble, random access resource information related to the at least one selected downlink beam, L1 uplink control information, a Medium Access Control (MAC) control element, and a Radio Resource Control (RRC) message comprising an index of the at least one selected downlink beam and a UE identity.

4. The method of claim 1, wherein the scheduling information differs for the multiple downlink beams.

5. The method of claim 1, wherein the selecting the at least one downlink beam comprises:
measuring quality of the multiple downlink beams transmitted by the BS; and
selecting the at least one downlink beam from among the multiple downlink beams based on the measured quality of the downlink beams.

6. The method of claim 5, wherein the at least one selected downlink beam includes a downlink beam of which measured quality is the best quality among the multiple downlink beams transmitted by the BS.

7. The method of claim 5, wherein the at least one selected downlink beam includes a downlink beam of which measured quality is greater than or equal to a predefined threshold among the multiple downlink beams transmitted by the BS.

8. The method of claim 5, wherein a plurality of downlink beams are selected based on the measured quality of the downlink beams.

9. The method of claim 1, wherein the scheduling information further comprises update information related to the MBMS control information, and the update information includes an update state of the MBMS control information.

10. The method of claim 9, wherein the update state of the MBMS control information is related to a value tag.

11. The method of claim 1, wherein a window of a time domain in which the MBMS control information is scheduled is defined for each downlink beam.

12. The method of claim 1, wherein a window of a time domain in which the MBMS control information is scheduled is defined for each set of multiple downlink beams.

13. A user equipment (UE) configured to receive multimedia broadcast multicast service (MBMS) control information through a downlink beam in a wireless communication system, the UE comprising:
a memory; a transceiver; and a processor for coupling the memory and the transceiver, wherein the processor is configured to:
receive from a base station (BS) a message comprising scheduling information for the MBMS control information related to each of multiple downlink beams;
select at least one downlink beam among the multiple downlink beams;
transmit to a base station (BS) an MBMS control information request message comprising at least one beam index respectively related to the at least one selected downlink beam; and
receive from the BS the MBMS control information through the at least one downlink beam in response to the MBMS control information request message,
wherein the MBMS control information includes at least one of system information related to MBMS, information included in Multicast Control Channel (MCCH), or information included in Single Cell-MCCH (SC-MCCH), and
wherein the message comprising the scheduling information is received through a physical downlink control channel (PDCCH).

* * * * *